United States Patent [19]
Gold et al.

[11] Patent Number: 6,151,081
[45] Date of Patent: Nov. 21, 2000

[54] LARGE SCREEN DISPLAY WITH PROJECTED OVERLAY AND METHOD OF USING SAME

[75] Inventors: Ronald S. Gold, Fullerton; Jerry E. Freeman, Irvine, both of Calif.

[73] Assignee: Raytheon Company, Lexington, Mass.

[21] Appl. No.: 08/982,670

[22] Filed: Dec. 2, 1997

[51] Int. Cl.[7] .................................................. H04N 5/74
[52] U.S. Cl. ............................................ 348/756; 348/588
[58] Field of Search ...................................... 348/756, 757, 348/588, 584, 586, 565, 117, 118, 781; 434/43, 44; 353/28, 29, 30, 35; 345/113, 114, 115

[56] References Cited

U.S. PATENT DOCUMENTS

| | | | |
|---|---|---|---|
| 4,398,799 | 8/1983 | Swift | 359/632 |
| 5,326,266 | 7/1994 | Fisher et al. | 434/44 |

FOREIGN PATENT DOCUMENTS

| | | |
|---|---|---|
| 0618471 | 10/1994 | European Pat. Off. . |
| 0640859 | 6/1996 | European Pat. Off. . |
| 2259213 | 3/1993 | United Kingdom . |

OTHER PUBLICATIONS

"Eye of the Law", *Vectors,* vol. XXXV, No. 2, 1993, pp. 10–12.

Bramley, Jenny, and Trelinskie, Edward G., "Bimodal Display of Topographic Information", Proceedings of the SID, vol. 21/2,(1980).

*Primary Examiner*—Victor R. Kostak
*Attorney, Agent, or Firm*—Leonard A. Alkov; Colin A. Raufer; Glenn H. Lenzen, Jr.

[57] ABSTRACT

A system and a method for controlled concurrent viewing of images, in their entirety, by the use of a dual viewer controllable dual display system having the added capability of individually presented resolution is disclosed. In operation, a viewer first selected image is provided by a first controllable display device and a viewer selected second image, typically different from the first, is provided by a second controllable display device. A viewer looks through the second display and sees the image presented by the first display and the image presented by the second display provided at the plane of the first display. Additionally, the displays can be interactive, in that an image or event provided on one display results in the presentation of an image or other data on the other display, all the while allowing the viewer to select from other information. Also the position of one image can be varied with respect to the other image.

4 Claims, 4 Drawing Sheets

LARGE SCREEN DISPLAY WITH PROJECTED OVERLAY AND METHOD OF USING SAME

BACKGROUND OF THE INVENTION

1. Field of the Invention

The present invention relates to a system and a method for viewing a pair of electronic represented images, in total and at the same time. The system has the added advantages of presenting images of differing resolution and can be interactive in nature.

2. Description of the Related Art

There has long existed a need for an image display system that would allow a viewer to view more then one artificial image at a time. A variety of approaches have been employed with limited success in an attempt to find a solution to this problem. One solution was to use multiple displays. This was achieved by placing two or more displays adjacent to one another and located within the same plane. While this approach did permit viewing of more than one image, as the displays became larger, concurrent viewing became more and more difficult primarily due to the distance between the images. In an attempt to remedy this problem, systems were developed that produce multiple images from a single source, for example, picture-in-picture (PIP) displays or by the use of "windowing" techniques.

In a windowing approach, a viewer who wants to see a second image selects the image, and it in turn is embedded within the first image on the same display. The second image, depending upon its size and shape, blocks all, or a portion of the first image. The PIP approach is quite similar to windowing. In a PIP system, a second image is projected onto the display replacing a portion, if not all of the first image, giving the effect that it is embedded within a first image. Because both the PIP and the windowing approaches result in some degree of blocking of a first image by a second image, true concurrent viewing cannot be achieved. Additionally, both PIP and windowing approaches are limited to the maximum resolution of the display, in that the maximum resolution of either image is constrained by the resolution capabilities of the display itself. While higher resolution displays do exist, such displays are quite costly. In addition, as displays size increases, performance is generally sacrificed. This is due to both system optics and the fact that as one moves radially outward from the center of the display the resolution capabilities of the system generally decrease.

Other systems do exist that permit concurrent viewing of images. However, those systems do not consist of two electronically generated displays, but consist of one electronically generated display, and a real world view. Additionally, with such systems the viewer is only able, at best, to control the image presented by the artificial display, not the image of the real world. An example of such a system is a "head-up display" (HUD). HUD systems have been used in automobiles and aircraft. In a HUD system a transparent surface is placed in front of the viewer who looks through it and sees the electronically generated image superimposed on the natural view of the outside world. In aircraft, HUD displays are generally used to provide navigation and weapons information to the pilot. The displays are commonly mounted on the aircraft canopy, or separate beamsplitter surface, and located directly in front of the pilot. The display superimposes its information on the pilots view of outside world. Thus, a pilot flying the plane looks through the display and sees not only the view in front of the aircraft, but also the data presented by the HUD display. The pilot has control only over the information presented by the HUD display, and is able to select a superimposed image for viewing from one of several instruments or systems on board the aircraft. However, the pilot does not have control over the natural view presented by the outside world, and at best could only change the natural view by repositioning the aircraft.

The HUD systems used in automobiles are similar to those used in aircraft, but are generally more restrictive. In an automobile, these systems are used to display speed, fuel or directional information, for example. However, more advanced systems have been developed for law enforcement application, see *Eye of the Law, Vectors*, Vol. XXXV, 2, 10–12, 1993. While these systems do have additional capabilities they are still limited to display of information from preselected instruments or other systems.

Similar to the aircraft system, the HUD system for automobiles provides its data superimposed on the drivers view of the outside world. However, in an aircraft the superimposed information is focused to infinity, whereas in an automobile the image appears to originate from a location above the automobile's front bumper. As in an aircraft, the driver of the automobile sees both the view in front of the automobile and the superimposed information provided by the HUD display. Thus, at best, the driver has control over the information presented by the HUD display and would likely be limited to a few predetermined instruments or systems for viewing.

In addition, the resolution capabilities of both the aircraft and automobile HUD systems are set by the respective system themselves, with the viewer having no control over the resolution of the natural image. Such systems generally provide only monochrome display and are not interactive in nature in that they only provide predetermined types of information.

SUMMARY OF THE INVENTION

The present invention provides a system and a method for viewing two artificial images, in their entirety and at the same time, while being able to select the images to be concurrently viewed. The system also provides the added capability of providing differing resolution of each image. In operation, a viewer selects an image which is provided by a first controllable display device and a second image, typically different from the first, which is provided by a second controllable display device. The viewer located inline with both displays, looks through the second display, and sees the image presented by the first display and the image generated by the second display provided at the plane of the first display allowing the viewer to see both images in their entirety. In such a system either display can be of higher resolution than the other. However, in a preferred configuration, the first display is a large screen display and the second display surface is a transparent glass or plastic plate containing a holographic coating.

In an second configuration of the invention, the second controllable display would preferably be capable of providing higher resolution images than the first, larger display.

In a third configuration of the invention, the displays are interactive in nature, in that specific or selected activity on one display results in the presentation of information on the other display.

In a fourth configuration, the second display is part of a system worn by the viewer. The display can be positioned as a shield, or visor, or monocular or binocular optic system located in front of the viewer's face. This approach gives the viewer the freedom to move about and not be constrained to a specific location. For this configuration, additional registration and tracking equipment/software would be required.

BRIEF DESCRIPTION OF THE DRAWINGS

These and other features, aspects, and advantages of the present invention will be apparent to those skilled in the art from the following detailed description, together with the accompanying drawings which.

DETAILED DESCRIPTION OF THE INVENTION

The present invention provides a system and a method for an viewer to view two artificial images, in their entirety and at the same time, by the use of a dual display system. In operation, a viewer looks through a second controllable display and sees an image presented by a first controllable display and the image presented by the second display located within the plane of the first display. The system additionally permits the viewer to select the images to be viewed and is capable of providing dual resolution viewing by the selection of displays of differing resolution. Additionally, the displays can be interactive in nature, for example, an image or event provided on one display results in the display of an image or other data on the other, all the while allowing the viewer to select from other information.

Figure 1:
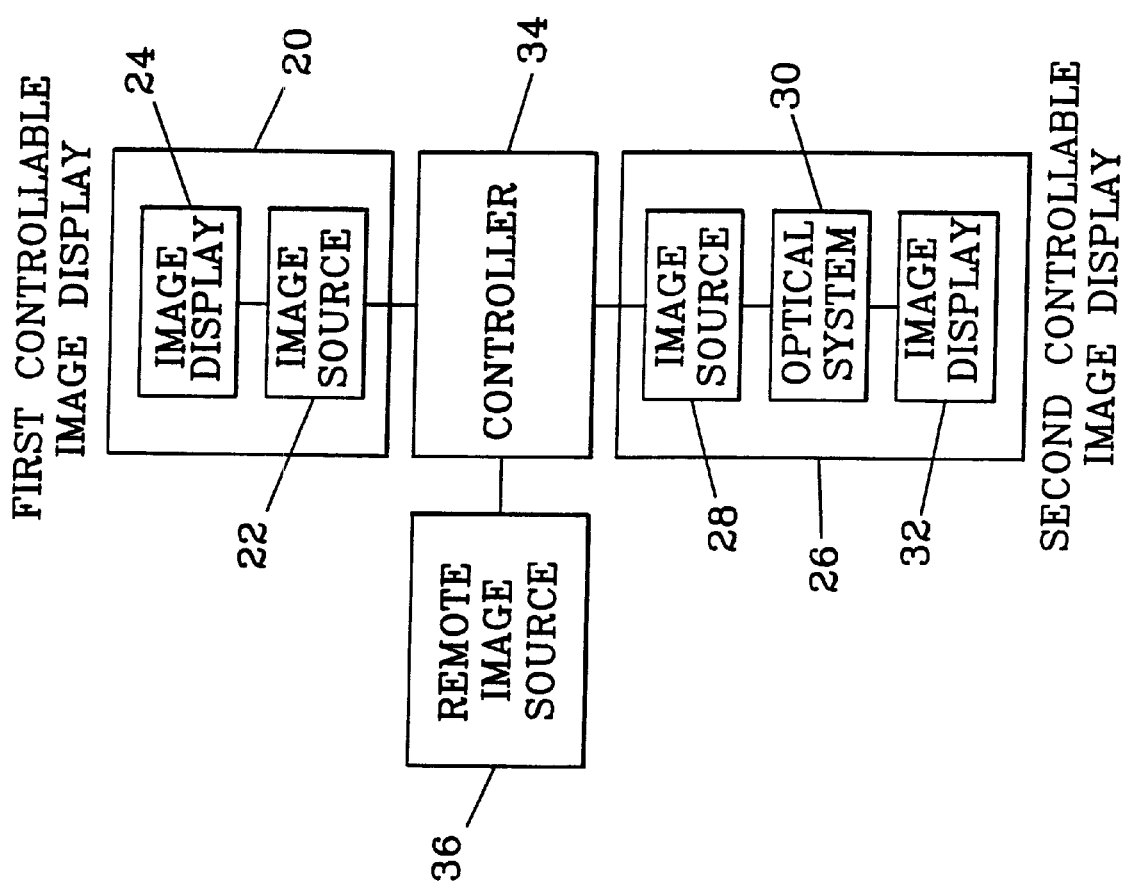
FIG. 1 is a block diagram of the invention.

The invention, as depicted in FIG. 1, consists of a first viewer controllable image display 20 which includes a first image source 22 and a first image display 24. Display 24 is preferably a large display, such as a flat panel display (FPD) or a large screen projection display (LSD). Images displayed by display 24 are either generated by image source 22 or provided to the system by an external source. The invention also contains a second viewer controllable image display 26 which further contains a second image source 28, an optical system 30 and a second image display 32. Like image source 22, image source 28 generates images internally or receives images from an external source. If the images are to be generated by image source 22 or 28, one or more image generation software packages, commonly known to those skilled in the art, may be required. These software packages are commonly resident within image source 22 or 28. Image source 28 further includes a projection device (not shown) which can be, among others, a cathode ray tube (CRT), a liquid crystal display (LCD), a field emission display (FED), a laser, or a light valve. The projection device of source 28 provides the image to optical system 30 which in turn relays the image to display surface or viewing surface 32.

Display 32 can be a variety of devices all of which provide images to a location which is not within the plane of the display itself. Preferably, the images provided by display 32 are projected forward, in front of display 32. Display 32 can be a clear glass or plastic plate upon which a holographic or other optical coating has been applied. If such a coating were not applied, the image would pass through display 32 and not be presented forward of the display. Thus, in operation, a viewer looks through display 32 and sees the image provided by optical system 30 presented at a location beyond display 32, and preferably located within the plane of display 24.

Both systems 20 and 26 may be connected to a viewer controllable controller 34. Also connected to controller 34 is a remote image source 36. Controller 34 controls the images selected by the viewer and displayed by systems 20 and 26. It is possible for systems 20 and 26 to each individually have a controller which controls the presentation of images to their respective displays. However, these controllers would likely still be managed by a master controller such as controller 34. Remote image source 36 can be a variety of devices providing static or dynamic imagery to controller 34. These images can be provided to controller 34 by a variety of methods, such as telephone, communication lines, radio, or the like.

Figure 2:
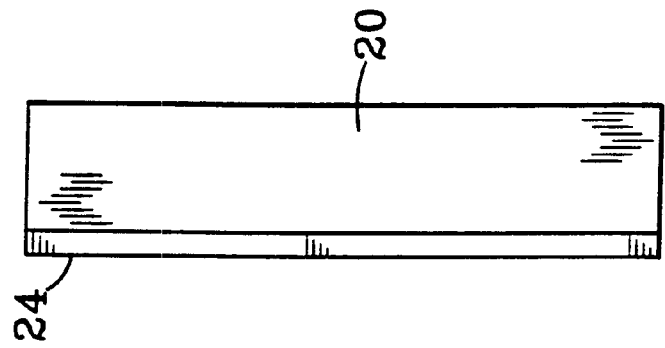
FIG. 2 is an elevation view of the invention depicting concurrent image viewing.
Figure 2:
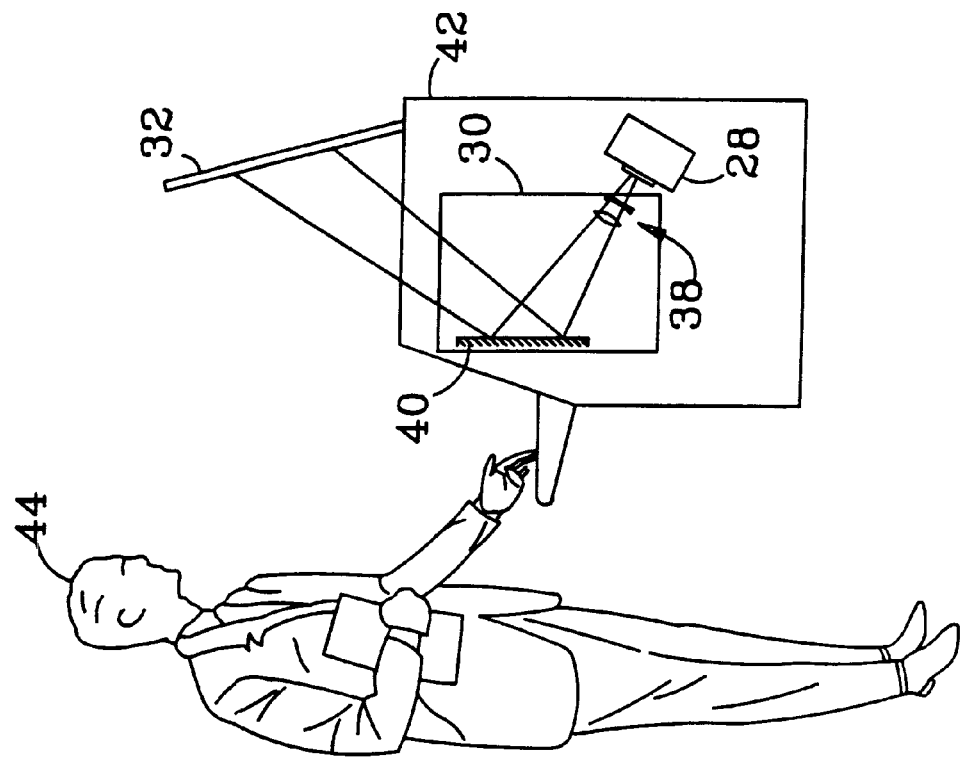

In operation, as shown in FIG. 2, a viewer selects an image which is provided to display 24. Concurrently, the viewer selects a second image which is provided by image source 28 and in turn projected through a set of intermediate optics 38 resident within optic system 30. Optics 38 provides the image projected by image source 28 to a reflecting surface 40 which in turn provides the image to display 32. Optic system 30 further contains an electro-mechanical or manual system (not shown) for positioning optics 38 and/or reflecting surface 40 enabling the image provided by display 32 to be provided at any location within the plane of display 24. In such a system reflecting surface 40 could be mounted on a gimbal with optics system 38 mounted in a three-dimensional, X-Y-Z, positioning device. The movement of both surface 40 and system 38 would be controlled by a controller (not shown) which is used to maintain the correct orientation between system 38 and surface 40 necessary to provide the second image. While system 26 can be an autonomous, stand alone system, it may also be built in, or retrofitted to an existing device, such as a command console 42.

A viewer 44 located at console 42 looks through display 32 and sees the image presented by display 24. Viewer 44 also sees the image presented by display 32 provided at the plane of display 24, "overlaid" upon display 24. The image provided by display 32 is of a different intensity or density then the image provided by display 24. This difference allows the viewer to see both images in their entirety and at the same time.

While the system of the invention is capable of producing and providing images which are displayed by displays 24 and 32, the system is also capable of displaying images received from remote site 36 of FIG. 1. Remote cite 36 is connected to controller 34 of FIG. 1 by a variety of devices, including among others, telephone, communication lines, radio, or the like. These images, like those provided by the source 22 and 28, can be static or dynamic, including real time imagery. Thus, either display has the capabilities of presenting both static and dynamic imagery.

In a second configuration of the invention displays 24 and 32 have differing resolution capabilities. For example, in a preferred configuration, display 32 would have a resolution capability that is greater than that of display 24. This would permit the viewing of high resolution images without the associated cost and performance sacrifices associated with a high resolution large screen or flat panel displays. Additionally, such an approach would result in a lower overall total bandwidth for the system as compared to a system having two high resolution displays. This approach also results in lower overall system costs while still providing higher resolution performance.

Figure 3:
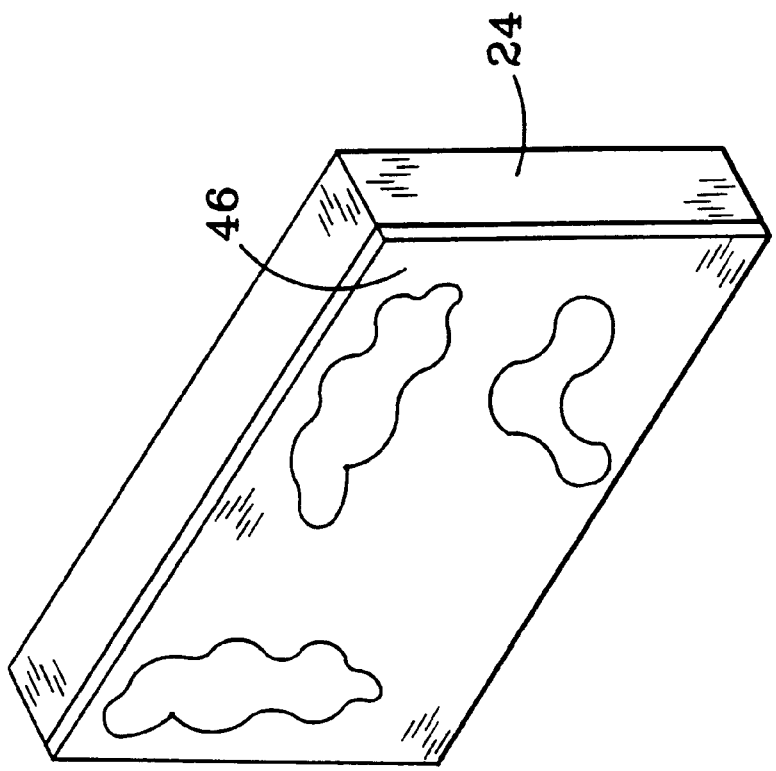
FIG. 3 is a perspective view of the present invention depicting concurrent image viewing.
Figure 3:
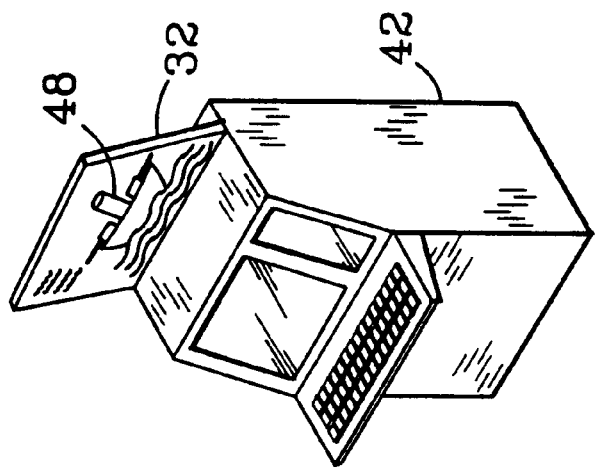

In a third system configuration, systems 20 and 26 of FIG. 1 can be interactive in that an event portrayed on one display results in presentation of an image on the other display, all the while allowing the viewer to select from other information. For example, as depicted in FIG. 3, if display 24 is presenting a static or dynamic battlefield image 46, and telemetry external to the dual display system identifies an inbound object, such as a missile, controller 34 of FIG. 1 can then provide system 26 of FIG. 1 with appropriate data regarding the object, which in turn is provided to display 32. The system can be further interactive in nature in that controller 34 of FIG. 1, based on the image 48 to be displayed by display 32, can determine the most appropriate location to overlay the image upon display 24 to provide optimal ease of viewing. This manipulation of the image location is conducted by the electro-optic system resident within optic system 30 of FIG. 1 which is positioned for example, in a housing 42. It will be apparent to those skilled in the art that the system of the invention is capable of a variety of interactive aspects in accordance with the invention without departing from the scope or spirit of the invention.

Figure 4:
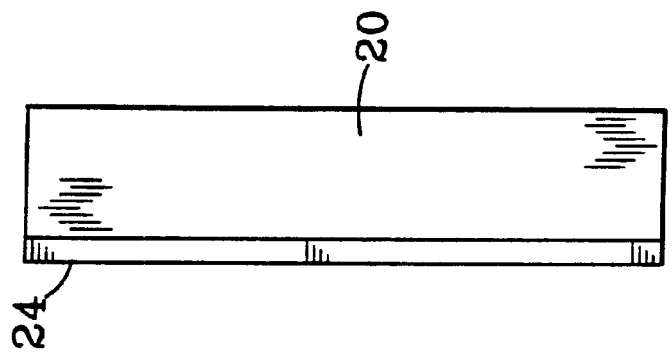
FIG. 4 is an elevation view of an alternate configuration of the invention depicting a viewer wearing a helmet mounted second display system providing concurrent image viewing.
Figure 4:
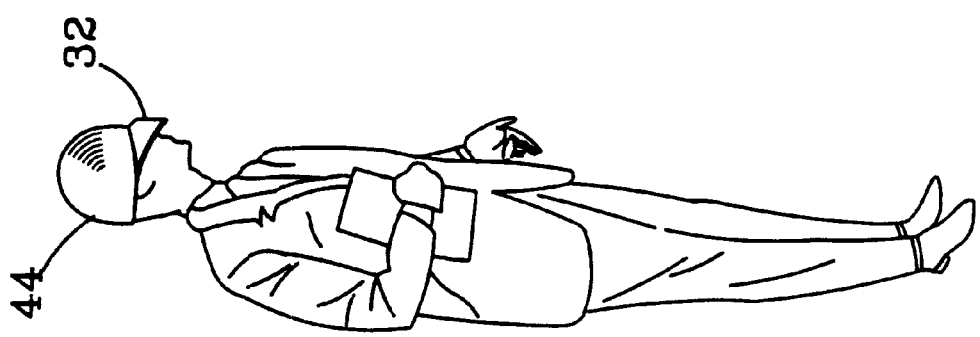

In a fourth configuration of the invention, as portrayed in FIG. 4, the second display device 32 can be mounted in a device worn by viewer 44. In a preferred configuration, the devices would be worn on the head of viewer 44 with display 32 being located in front of the viewer's face, for example, as a face shield, an eye piece, or other similar type display device, and would be attached to a helmet or hat worn by the viewer. Thus viewer 44 would look through display 32 and see the image provided by display 24 and the image of display 32 overlaid upon it. If viewer 44 is permitted to move from the initial viewing location while still being able to view the images concurrently, a positioning sensor (not shown) would be required to coordinate the location of viewer 44 relative to display 24. In addition to the sensor, compensating optics (not shown) would also be required in order to assure that the image presented by display 32 was provided at the plane of display 24.

Selection of imagery to be displayed by display 24 or display 32 can be accomplished by a variety of techniques. In a fifth configuration of the invention, a pointing device, such as a laser pointer is used to select a specific target on display 24 for which a high resolution image of the item, or other pertinent data, is provided by display 32. Also contemplated is an eye tracking system in which the specific image selected is based on the item viewed at the time of selection. Such a system has been used in other applications and is know by those skilled in the art.

While the invention is particularly suited for a single viewer environment, it is equally applicable to situations in which several viewers are present, each having an individual display 32 and viewing a common large screen or flat panel display 24. However, in such a situation only one viewer would be able to control the large display. Additionally, it is also contemplated that the multiple viewers could view a common large screen display 24 with each having the ability to control a portion of the display.

While the system of the invention has been initially described for use in command and control applications relating to combat systems, the invention has applicability to a variety of other systems, including among others, maritime systems for vessel traffic control, air traffic control systems, remote system operations, such as hazardous materials handling/cleanup, repair and maintenance functions and security systems.

Although the present invention has been described in considerable detail with reference to certain preferred configurations thereof, other versions are possible. Therefore, the spirit and scope of the appended claims should not be limited to their preferred versions contained therein.

We claim:

1. A system for simultaneous display of at least two separate images comprising:

an image projector for providing a first beam of electromagnetic energy;

a first surface for receiving said beam and displaying a first image in response thereto;

means disposed on said first surface for reflecting a second beam from said first beam; and a second surface for receiving said second beam and displaying a second image in response thereto.

2. The invention of claim 1 wherein said means disposed on said first surface is a holographic coating.

3. The invention of claim 1 wherein said image projector includes means for projecting a beam on a first side of said first surface and said first surface includes means for displaying an image viewable from a second side thereof.

4. The invention of claim 3 wherein said second beam is received on a first side of said second surface and said second surface includes means for displaying said second image whereby said second image is viewable from said second side of said second surface.

* * * * *